United States Patent [19]
Etter

[11] 3,982,883
[45] Sept. 28, 1976

[54] METHOD OF FLAME CUTTING

[76] Inventor: Berwyn E. Etter, 10355 Paradise Blvd., Treasure Island, Fla. 33706

[22] Filed: Mar. 18, 1975

[21] Appl. No.: 559,486

Related U.S. Application Data

[63] Continuation-in-part of Ser. Nos. 418,271, Nov. 23, 1973, abandoned, and Ser. No. 499,533, Aug. 22, 1974.

[52] U.S. Cl. .................................. 432/13; 34/4; 148/9 C; 431/4
[51] Int. Cl.² ........................................ F27B 9/28
[58] Field of Search ............... 34/4; 431/4; 148/9 C; 432/13

[56] References Cited
UNITED STATES PATENTS

| | | | |
|---|---|---|---|
| 2,465,978 | 3/1949 | Meincke | 148/9 C |
| 3,385,647 | 5/1968 | Miller et al. | 431/4 |
| 3,473,972 | 10/1969 | Wiebke et al. | 431/4 X |
| 3,746,504 | 7/1973 | Solbrig | 34/4 |

*Primary Examiner*—John J. Camby

[57] ABSTRACT

A method of flame cutting using an improved industrial fuel gas composition consisting of an industrial fuel gas such as propane, butane, natural gas and acetylene, or a mixture thereof, and a supplemental hydrocarbon additive which, when combusted, emits radiant energy waves within the range of greatest absorbability of the material being cut.

3 Claims, 4 Drawing Figures

METHOD OF FLAME CUTTING

This is a continuation-in-part of application Ser. No. 418,271, filed Nov. 23, 1973, now abandoned, and Ser. No. 499,533, filed Aug. 22, 1974.

BACKGROUND OF THE INVENTION

This invention relates generally to the art of cutting, brazing, and gouging of metals, alloys and like materials, and specifically to a method of rapid cutting of metals.

In a typical metal cutting operation, a cutting torch is connected to a source of fuel gas and to a source of oxygen. The oxygen and fuel gas mixture is combusted while so juxtaposed with respect to a work piece, such as a metal plate or the like, that the work piece is first preheated, and then cut. After the metal which is to be treated has risen to a predetermined temperature, i.e. after the preheating stage is over, the percentage of oxygen in the oxygen fuel gas mixture is increased in order to increase the temperature of the flame. The increased temperature of the flame then provides a suitable source of heat for cutting, brazing, gouging or any similar process, such as welding or flame hardening.

Typical fuel gases include natural gas, propane, acetylene, and mixtures thereof. These gases, when combusted with oxygen, can provide very hot flames in the general range of from 4,500°F. up to and perhaps slightly above 5,500°F.

The cost of natural gas, propane, butane, and acetylene is not inconsequential. Therefore, it is desirable to have the greatest efficiency of treatment per quantity of industrial fuel gas employed. This is especially true when the supply of natural gas, propane, butane and acetylene is somewhat limited.

One measure of the efficiency of an industrial fuel gas is the quantity of gas needed to perform a given job. With respect to fuel gases utilized for metal working, such as metal cutting, another measure of efficiency is the cutting speed. A decrease in the quantity of fuel gas needed to perform a given cutting operation, coupled with an increase in cutting speed or capacity, will result in increased cost savings per foot of cut or like treatments. Thus, an ideal fuel gas would be one which would provide rapid treatment with a minimum quantity of fuel and oxygen employed.

In addition to the considerations mentioned above, the acceptability of a fuel gas is also determined by an examination of the quality of cuts, obtained when utilizing a certain fuel gas.

Yet another standard of measurement of the acceptability of a fuel gas is its affect upon the metal or alloy which is being treated. For example, subjecting high carbon containing steel alloys to high temperatures for extended periods of time is known to affect the crystal structure of the alloy itself. For example, the crystal lattice of the alloy may be changed from a body centered crystal structure to a face centered crystal structure, and as a result, the steel becomes harder and more brittle. The hardened steel in the absence of compensating heat treatment is, of course, much more difficult to machine. However, if a fuel gas could be developed which would satisfactorily complete a cut within a very short period of time, there may be insufficient time for the alloy to be deleteriously hardened.

Yet another important consideration in determining suitability of a given industrial fuel gas, and specifically those fuel gases utilized for cutting purposes, is the general appearance of the cut after it is made. A good cut is one which has a generally straight line appearance, little or no rollback, little or no evidence of burning of the metal, and little or no slag present along the line of the cut. Conversely, a bad cut is characterized by an irregular surface along the cut, a general appearance of dishing out along the cut, excessive slag along the line of the cut with the slag sticking to the cut and being very difficult to remove, and a general burned appearance over the line of the cut.

Yet another important attribute of a good quality fuel gas is that the gas must be completely combustible to carbon dioxide and water. Thus, gases which could potentially be useful industrial fuel gases but which will provide sulphur or nitrogen oxides as byproducts are unsuitable because of their undesirable pollution effects.

This invention relates to a method of flame cutting using a novel fuel gas composition, which makes possible the utilization of a minimum quantity of fuel gas to accomplish a given metal cutting task in a minimum of time, and provides a high quality cut, all without having a significant adverse effect upon the crystal structure characteristics of the metal being treated. In addition, the byproducts of the combustion of the industrial fuel gas compositions are nearly all carbon dioxide and water, indicating nearly complete combustion. Thus, there is no utilization of hazardous additives which will provide undesired polluting combustion byproducts such as sulphur dioxide and nitrogen oxides.

An application of the invention is illustrated more or less diagrammatically in the following drawing wherein:

DETAILED DESCRIPTION OF THE INVENTION

Figure 1:
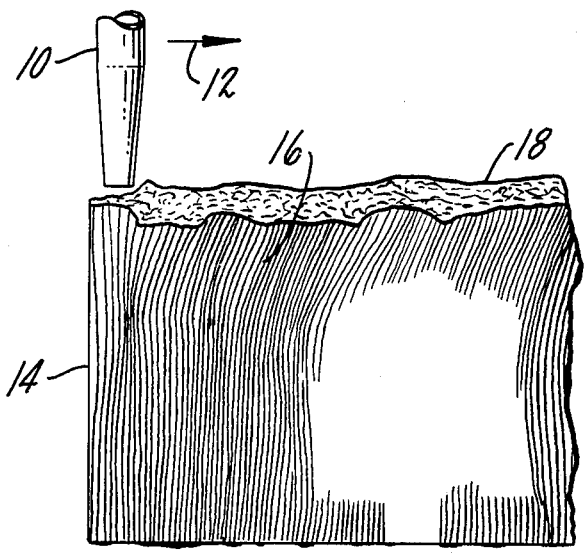
FIG. 1 is a frontal, elevational view transverse to the direction of cutting, of a torch cut made according to a method in the prior art, and without the additives of this invention.

Heretofore it has often been assumed by those in the industry of using and forming fuel gases that the hotter the gas flame during combustion the more efficient the metal treating process would be. It has now been surprisingly discovered that this is not always the case. In fact, it now appears that efforts to increase flame temperature by utilizing greater quantities of oxygen and fuel gas may have in fact accomplished little improved results. Moreover, the increased use of oxygen and fuel gas has probably to some extent been wasteful. In accord with the method of this invention the fuel gas is tailored in formulation for the specific job to be accomplished. Thus, the characteristics of metal, alloy or like material which is to be treated should be taken into consideration in the formulation of the fuel gas.

In order to more clearly understand this invention, a basic understanding of certain heat energy principles is essential. A very elementary description of those principles essential to an understanding of this invention will, therefore, be provided herein.

When a flame is utilized as a heat source, whether in an industrial fuel for metal treating such as cutting or for heat transfer in home heating or the like, there are two operative heat transfer mechanisms.

The first heat transfer mechanism arises from the kinetic energy of the combustion of gas molecules, and the second from radiation of the flame.

With respect to kinetic energy heat transfer, the combustion of a fuel gas first sets the gas molecules into a rapid state of motion. These molecules then collide with the surface of the material to be treated and, by transfer of their kinetic energy, set the molecules of the treated material into rapid motion. These molecules, in turn, strike other molecules.

The higher the heat of combustion of a fuel gas, the higher the temperature of the flame and the greater the kinetic energy of the molecules of the gas. Consequently, more kinetic energy (heat) can be transferred to a given treated metal surface in a unit time, thereby producing the required melting or vaporizing of the metal in a shorter period of time.

A flame is also a source of electromagnetic radiation. Radiant heat rays, like visible light, are electromagnetic waves and have properties common to visible light. In this regard, as with light, the rate at which a body radiates or absorbs heat depends, not only upon the absolute temperature, but upon the nature of the exposed surfaces as well. Objects that are good emitters of heat are also good absorbers of the same kind of radiation.

The ralationship between the emission of electromagnetic radiation for a heated solid and the absorption of radiation by another solid is given by Kirchhoff's Law of Radiation. This law states that the ability of a given substance to emit radiation when heated is proportional to its ability to absorb radiation. Thus when radiation is completely absorbed by a substance it is converted into heat, the quantity of heat being equivalent to the total energy of the radiation absorbed.

The emission and absorption characteristics of radiant energy of course varies for differing materials. Thus one metal, alloy, element, or like material, will have different emission and absorption characteristics for radiant energy from another metal, alloy or element. These characteristics are in fact often utilized in instrumental analysis to identify the composition or metals, alloys, and the like. This is accomplished by spectrograph analysis. An emission spectrograph is obtained by exciting thermally the material to be studied and the wave lengths of emitted radiation are recorded. Conversely, with an absorption spectrograph the wave lengths of absorbed radiant energy by a given body are recorded.

It now appears that radiant energy waves having frequencies equal to the natural frequencies of the atoms of the metal alloy or element to be treated are absorbed with great efficiency.

Drawing an analogy to sound waves, it is well known that a tuning fork placed near another vibrating tuning fork will itself begin vibrating when the frequency of vibrations of the first tuning fork are at the same frequency which will activate the second tuning fork. Thus, the first tuning fork can be vibrating at a very high frequency rate and have no affect upon the second tuning fork. On the other hand, once the first tuning fork is in "harmony" with the vibrational frequency which will activate the second tuning fork the second tuning fork will then begin vibrating. These same principles it is now believed will generally apply also to heat transfer.

Every metal element, alloy or other material which is to be heat treated has a general range of wave lengths of radiant energy which it can most efficiently absorb. When the metal alloy or like material is therefore subjected to a source of emission of radiant energy with the emitting source emitting a high percentage of those radiant energy waves of the same length that the material to be treated will most efficiently absorb, a maximum efficiency of radiant energy transferred is obtained. Thus, an important factor in efficient utilization of a fuel gas is whether the combusting fuel gas will emit radiant energy of a wave length susceptible to good absorption by the material to be treated.

An additional measure of the efficiency of a fuel gas is the examination of the exhaust gases after combustion of the fuel. Complete combustion of a hydrocarbon fuel gas will result in only carbon dioxide and water as end products. This is extremely advantageous in that carbon dioxide and water are harmless products, not harmful pollutants. Thus, to the extent that combustion of a fuel gas is incomplete, as indicated for example by the presence of carbon monoxide, complete release of the heat of combustion of the fuel gas is not achieved, and therefore the combustion is less complete than what is inherently available.

In accord with this invention it has now been discovered that certain additives, all of which are nontoxic, produce no polutting byproducts, and are safe for handling purposes, significantly increase the work capacity of a fuel. While applicant does not wish to be bound by any theory, it is believed that the fuel additives of this invention, when added to an industrial fuel gas, provide increaded fuel efficiency and work capacity because of the increased energy released by the heat of combustion of the fuel additives and because the additives, when combusted along with the fuel gas, will emit radiant energy at a wave length susceptible to absorption by the material, metal, alloy or the like which is to be treated. Thus when industrial fuel gas such as natural gas, for example, is saturated with the additives of this invention, mixed with oxygen and burned, much more energy is available at the point of application to the work piece.

The industrial fuel gases utilized in industry are, of course, in a gaseous state. The additives of this invention are, at ambient conditions, preferably in a liquid state. In a typicl operation employing a conventional industrial fuel, the fuel is passed through a vessel containing the additives of this invention. The liquid additives of this invention are vaporized depending on the conditions of temperature and pressure employed. For complete saturation of an industrial fuel gas with vapors of the liquid additives of this invention it may be necessary to pass the industrial fuel gas through two or more vessels containing the liquid additives.

The additives suitable for use with industrial fuel gases previously disclosed herein can be described as normally liquid at ambient conditions and, further, as compounds which, when combusted, yield only carbon and hydrogen containing byproducts and are selected from the group consisting of hydrocarbons, alcohols, esters, or mixtures thereof.

As an example, Flamex compound, which is composed of a series of hydrocarbons in the form of a solution, a mixture, or a chemical compound, or as a combination of all three, may be used. To the basic fuel gas is added oxygen and the Flamex compound for the purpose of securing energy release from the resulting combustion process at wave lengths to which the material to be treated is receptive to absorption at a high rate.

The preferred hydrocarbons are $C_5$ to $C_{20}$ straight and branched chain alkanes and cycloalkanes, straight and branched chain alkenes and cycloalkenes, straight and branched chain alkynes and cycloalkynes; aromatic compounds selected from the group consisting of mononuclear aromatics, i.e. benzenes, and including as polynuclear aromatics naphthalenes, anthrazenes and phenanthrenes. Additionally, $C_7$ to $C_{20}$ arenes, namely straight and branched chain substituted benzenes may be used.

Experience and testing has shown that the additives for the industrial fuels preferably should be liquid at ambient conditions for several reasons. Firstly, the liquid additives are the easiest to handle; secondly, the lower chain length liquid additives have a substantial vapor pressure at ambient conditions and can be readily vaporized for convenient mixture with industrial fuel gases; and thirdly, they are readily available.

A chain length of from about $C_5$ to about $C_{20}$ has been found to be a practical range of utilization in this invention. Where the chain length is lower than $C_5$ it has been found that the heat of combustion of the hydrocarbon compound, or likewise with respect to the alcohol and ester compounds, is so low that no substantial improvement in fuel utilization is note. On the other hand, where the chain length is above $C_{20}$ many potential compounds are not liquid, are not readily available, and if available, and even if liquid, will result in a very small amount of the additive being picked up by the industrial fuel gas.

It is also important to note that the additives of this invention should preferably be nonsubstituted compounds. That is to say, they should be comprised of only hydrogen and carbon, and with respect to the alcohols and esters, oxygen in addition. There should be no substitutions of, for example, sulphur, chlorine, other halogens and the like. This is important because it has been found that substituted hydrocarbons, alchohols, and esters will provide undesirable polluting products upon combustion. For example, compounds containing sulphur and nitrogen which are known to be hazardous pollutants.

The amount of the fuel gas additive employed can be varied. Generally the greater the amount of additive mixed with the industrial fuel gas, the greater the heat of combustion and the greater the potential for effective heat transfer because of the increased work capacity of the fuel upon combustion. However, it has been found that when excessively rich compositions which contain very high percentages of the fuel additives of this invention are combusted there is a tendency for incomplete combustion which results in decreased efficiency and, as a consequence, increased costs and an increase in the amount of carbon monoxide present. Generally it has been found that satisfactory levels of the additives are from about 0.1% by volume of the industrial fuel gas up to the saturation level of said gas at the given temperature and pressure conditions of the fuel gas. As a general guideline, satisfactory results are obtained when the amount of additive composition is from about one pound of additive per 100 cubic feet of fuel gas to one pound of additive to 300 cubic feet of fuel gas with one pound of additive to 200 cubic feet of fuel gas being preferred.

On a weight basis, the amount of fuel gas additive can be within the range of from one-half percent by weight of the additive up to twenty percent by weight of the fuel gas. However, a more practical range of addition is from two percent by weight to ten percent by weight and most preferably from 2.5 percent to 7.5 percent by weight of the industrial fuel gas.

Further, the additive, when combusted, should emit radiant energy at a wave length within the range of greatest absorptivity for the material to be treated.

If the herein described additive or additives are present, radiant energy will be emitted at a wave length within the wave length range of greatest absorptivity of the material to be treated. The result is an increased rapidity for performing the job, utilization of a minimum quantity of fuel gas, an increased quality of cuts, brazing, gouging, or like treatment, and, because the job is accomplished very quickly, a noticeable lack of deleterious change in hardness characteristics of the metal, alloy or like material being treated.

Determining the percentage of greatest wave length absorption for any metal alloy or the like is not difficult. It is generally readily available in absorption spectra data presented in the most of the conventional handbooks. Likewise, determination of the emission spectra for the combustion of any additive is not difficult. Emission spectra are also presented in most handbooks for most potential additives to fuel gases.

In general, straight chain compounds will perform better than branched chain compounds and are, therefore, preferred; alkenes will perform slightly better than saturated compounds and are, therefore, preferred; long chain compounds will perform very well on preheating and are, therefore, preferred for compositions which are designed to provide a quick preheat; cylic compounds will perform better than straight chains; and strained ring compounds will perform better than stabilized rings, i.e. cyclopentane is a better additive than cyclohexane. Cyclopentane is a preferred compound for additive use because it reaches vapor pressure stability with extreme speed.

The following examples are offered to further illustrate but not limit the invention disclosed herein.

EXAMPLE 1-19

In examples 1 through 17, as shown in the table here below, two inch steel stock was preheated and then cut using a gaseous cutting fuel comprised of natural gas to which the specified additive had been added. Generally it can be said that the amount of methane present in natural gas comprises about 97% of the natural gas. The remaining portion comprises lower alkanes, usually $C_2$ to $C_5$ all in minor amounts.

In examples 18 and 19, propane was utilized as the industrial fuel gas.

Control numbers 1 and 2 are shown in the table to indicate the performance of natural gas alone without any fuel additives.

In conducting the tests shown in the table setting forth examples 1 through 19, the following procedure was employed.

Dual experimental generators were constructed. These identical units were capable of providing a variable liquid level of additive, thus providing a means for controlling the vapor concentration in the fuel gas. The cutting torch utilized was of conventional construction and had a standard HF-7 nozzle. All analyses reported in Examples 1 through 19 were performed by gas chromatograph employing either flame ionization or thermoconductivity detectors. The standard cutting conditions which were utilized to make the cuts in order to evaluate the effectiveness of the fuel gas were established for each fuel tested by adjusting the flame until optimum cutting conditions were established for the fuel with no additive addition. This cut then served as the standard for judging the quality of torch cuts obtained when using the fuel plus the additive.

At the beginning of each test the generator was filled to its maximum capacity with liquid additive at ambient conditions. The fuel gas was then passed through the generator to vaporize a quantity of the additive which was then carried by the fuel gas into the burning torch. The torch was adjusted for an optimum flame and a maximum acceptable cutting speed was established.

The liquid level was then reduced in the vapor generator by adjusting its heighth to 12 inches and the cutting test described above was again repeated.

Thereafter, the generator liquid level was adjusted to 6 inches and the cutting test was once again repeated.

Of the three tests run for each sample, that test giving the optimum cutting speed was chosen for further evaluation. A test bar of high carbon steel having an approximate thickness of two inches was employed. A preheat time was then established for the flame by timing the lapse of time which occurred until a localized spot on the metal upon the first heating was pierced. The exhaust gases were sampled and a sample of the fuel gas plus the additive was removed for analysis.

In each of the experiments reported in Examples 1 through 19 the fuel and oxygen ratios were adjusted until the best possible cutting flame, as determined by skilled operators, was achieved under each set of experimental conditions. In each example the same steel stock was employed. Likewise the same torch was used for all tests.

In each of Examples 1 through 19 the cut was a good cut showing a straight-line cut with little or no rollback, no evidence of any irregular surface and dishing out, and there was little slag present and what slag was present was easily removable. Examples 1–17 used natural gas as the fuel and Examples 18 and 19 used propane.

Fuel savings, oxygen savings and production savings were calculated as follows:

$$\text{Production savings} = \frac{S_1 - S_2}{S_2} \times 100\%$$

$S_1$ = cutting speed in inches/minute with test additive.
$S_2$ = cutting speed in inches/minute with natural gas only.

TABLE

| Ex. No. | Additive | Preheat Time (seconds) | Cut Speed (Inches/min) | General Ht.-Ins. | Vapor Pressure psia-70F | Vapor Concentration Fuel Gas (% of Vol.) | Exhaust Gas Vol. % $CO_2$ | Fuel Flow (ft³/hr) | $O_2$ Flow (ft³/hr) | Fuel Svgs. (%) | $O_2$ Svgs. (%) | Production Increase (%) |
|---|---|---|---|---|---|---|---|---|---|---|---|---|
| 1 | 1-pentene | 33.0 | 18.0 | 6 | 10.7 | 19.0 | 3.90 | 20. | 55. | 28.8 | 28.0 | 12.5 |
| 2 | cyclopentane | 28.9 | 18.0 | 18,23,6 | 5.3 | 12.0 | 1.30 | 20. | 50. | 28.8 | 34.6 | 12.5 |
| 3 | n-heptane | 72.0 | 17.0 | 18 | 1.6(100°F) | 4.0 | 0.90 | 20. | 48. | 34.7 | 33.5 | 5.9 |
| 4 | 2,2,4-trinethyl-Pentane | 29.7 | 16.0 | 18 | 0.8 | 1.9 | 5.25 | 20. | 50. | 20.0 | 26.5 | 0.0 |
| 5 | n-octane | 16.0 | 17.0 | 12 | 0.5(100°F) | 0.40 | 4.50 | 20. | 50. | 24.7 | 30.8 | 6.2 |
| 6 | methyl benzene | 103.0 | 16.5 | 18 | 0.4 | 0.40 | 5.00 | 20. | 40. | 22.4 | 42.9 | 3.0 |
| 7 | 2,2-dimethylpropane | | | | 22.0 | 100. | | | | | | |
| 8 | cyclohexane | 75. | 18.0 | 6 | 3.3(100°F) | 3.4 | 5.70 | 20. | 50. | 28.8 | 34.6 | 12.5 |
| 9 | 1 pt. 1,5 hexadiene 2 pts, 3,3 dimethyl-1-butene | 99.5 | 18.5 | 14 | 7.1 | 3.7 | 4.60 | 20. | 50. | 30.8 | 36.4 | 15.6 |
| 10 | SAE 10W motor oil | 75.0 | 18.0 | 18 | — | <1.0 | 2.25 | 20. | 50. | 28.8 | 34.6 | 12.5 |
| 11 | mixed hexanes | 59.8 | 16.0 | 18 | 1.6 | 8.5 | 4.00 | 20. | 50. | 20.0 | 18.9 | 0.0 |
| 12 | n-pentane | 32.5 | 17.0 | 16 | 8.6 | 30.0 | 5.75 | 20. | 65. | 24.7 | 9.5 | 6.2 |
| 13 | 2-methylbutane | 33.3 | 17.0 | 18 | 11.4 | 39.0 | 3.00 | 20. | 80. | 24.7 | −10.0 | 6.2 |
| 14 | spec. mixture-n-pentane: iso-pentane: mixed hexanes: | 48.3 | 18.0 | 18 | 9.5 | 5.0 3.0 | 1.40 | 18. | 60. | 36.0 | 21.6 | 12.5 |
| 15 | 1-octene | 43.3 | 17.5 | 12 | 0.2 | 0.30 | 1.60 | 20. | 50. | 26.8 | 32.8 | 9.0 |
| 16 | Wesson Oil | 41.5 | 16.0 | 18 | — | <1.0 | | 20. | 50. | 20.0 | 26.5 | .0 |
| 17 | Rubbing alcohol | 50.0 | 16.5 | 23 | | | | 20. | 50. | 22.4 | 28.7 | 3.0 |
| 18 | n-pentane | 109.0 | 19.0 | 18 | 8.6 | 30.0 | 0.80 | 16. | 70. | 46.0 | 13.3 | 18.7 |
| 19 | Cyclopentane | 84.0 | 29.0 | 18 | 5.3 | 12.0 | 7.25 | 18. | 58. | 39.0 | 28.0 | 18.7 |
| Control No. 1 - Natural Gas | | 109.0 | 16.0 | | | | | 25. | 68. | | | |
| Control No. 2 - Natural Gas | | 106.0 | 16.0 | | | | | 25. | 68. | | | |

It should be noted that an especially preferred composition both from the standpoint of efficiency and overall performance characteristics is a mixture of n-pentane, isopentane and mixed isomers of hexane. This preferred additive composition is from 0.1% up to a vapor saturation level of the hydrocarbons. The n-pentane, isopentane and mixed hexanes components of the additive are preferably present in a ratio of about 8:8:1–2 by volume, that is 8 parts n-pentane by volume, 8 parts isopentane by volume and 1 to 2 parts mixed hexane isomers by volume. If desired, n-pentane alone or any other isomer of hexane can be used singly or in combination with other hexane isomers to form the hexane portion of the formulation.

The flash point of this most preferred formulation is within the range of −16°F. to about −19°F. The boiling point range as measured from initial boiling point to maximum boiling point is from 81°F. to about 126°F. The vapor pressure of the most preferred formulation at various temperatures is as follows:

| Temperature | Vapor Pressure, Psia |
|---|---|
| 32°F. | 1.47 |
| 100°F. | 17.24 |
| 158°F. | 90.70 |

The specific gravity as measured by the ASTM Method D 1657–64 is 0.637± 1; and the density as measured by the ASTM Method D 1298-67 is 5.30± 1 lbs./gal. The ASTM Methods referred to herein are incorporated herein by reference.

As an example, the components in one formulation of the preferred additive composition was the following:

| Component | Volume Percent |
|---|---|
| isopentane | 44.4 |
| n-pentane | 44.4 |
| 2-methyl pentane | 1.3 |
| 3-methyl pentane | 2.1 |
| methycyclohexane | 1.5 |
| n-hexane | 6.3 |

FIG. 1 of the drawing shows a cut using propane only as the hydrocarbon component of the cutting fuel. The cutting torch 10 was used to cut in the direction shown by arrow 12. The cut was made on a 2 inches piece of high carbon steel 14 by increasing the temperature of a localized area of the work piece material to a temperature suitable for cutting as evidenced by a small pinhole like cut actually being completed. Thereafter the cutting torch is moved in the direction of arrow 12 along work piece 14.

Figure 2:
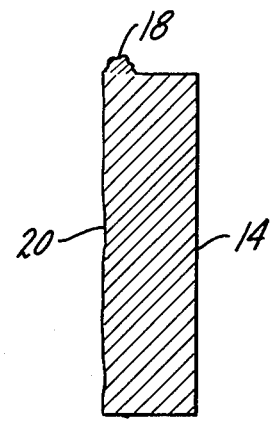
FIG. 2 is an end view of the cut of FIG. 1.

As seen in FIG. 1, the cut using propane only as the hydrocarbon component of the cutting fuel has much evidence of rollback 16 and as indicated by the extreme unevenness at 18, for example, has much slag present along the line of the cut. Rollback 16, and uneven cuts caused by slag are evidence of poor cutting and fuel efficiency. Additionally, poor cuts when viewed along the longitudinal axis of the cut as in FIG. 2 often show dishing out, 20, along the cut.

Figure 3:
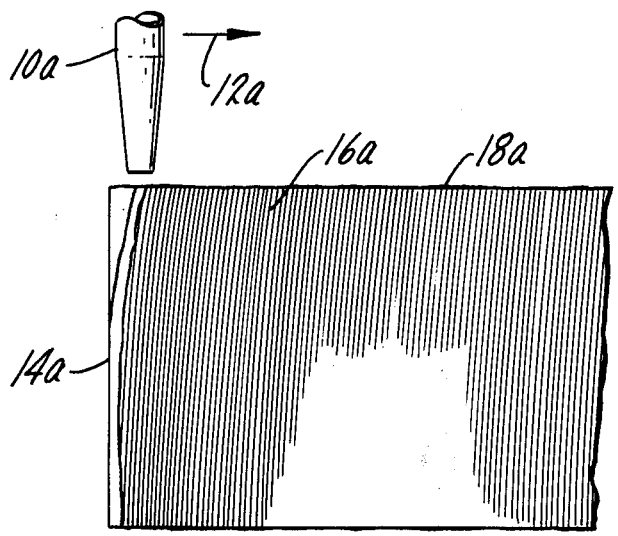
FIG. 3 is a frontal, elevational view of a torch cut made according to the invention.
Figure 4:
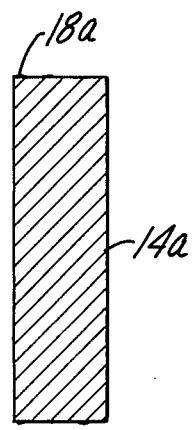
FIG. 4 is an end view of the cut of FIG. 3.

A good cut employing the additive formulation of Example 14 as an additive to propane is shown in FIGS. 3 and 4. There the torch tip 10a was used to cut along the line of directional arrow 12a on work piece 14a. The lines of the cut 16a are generally parallel and show little or no evidence of rollback and have an even edge at 18a indicating an absence of slag along the cut. The straight line at 20a shows no evidence of dishing out. The cut was a good one.

A can be seen, when comparing the fuels employing the fuel additives of this invention with the control fuels in control No. 1 and No. 2, a substantial increase in cutting speed was noted, the fuel and oxygen efficiencies were greatly increased, the preheat time was decreased and, as previously explained, the quality of the cut was better.

While the above examples 1–19 show with particularity the use of natural gas and propane as the industrial fuel, it is believed substantially similar results will be achieved when butane and acetylene are employed in that with the additives of this invention, better cuts, improved fuel efficiency, improved cutting speed, oxygen savings and production increase are obtained.

EXAMPLE 20–24

Using the most highly preferred fuel additive comprising a mixture of n-pentane, iso-pentane and mixed hexanes in a volume ratio of 8:8:1–2 a series of cuts were made in conventional fashion as previously described. Cuts were made with the industrial fuel gas, or mixtures thereof, without additive, and thereafter under identical conditions with the preferred additive present at a vapor saturation level.

TABLE II

| Work Material Cut | Industrial Fuel Used | Cutting Speed Feet Per Hour | Cost Per Foot $ | Cost Savings % $\frac{(a)-(b)}{a} \times 100$ |
|---|---|---|---|---|
| 20. ⅞" shop coated plate | (a) propane and from 8% to 30% propalene | 82.5 | .1414 | — |
| | (b) same as (a) with 4:4:1 mixture of pentane, iso-pentane and mixed hexanes | 95 | .1205 | 14.7 |
| 21. ½" shop coated plate | (a) natural gas | 80 | .143 | — |
| | (b) same as (a) with 4:4:1 mixture of pentane, iso-pentane and mixed hexanes | 100 | .113 | 20.9 |
| 22. 7/16" shop coated plate | (a) natural gas | 73.75 | .155 | — |
| | (b) same as (a) with 4:4:1 mixture of pentane, iso-pentane and mixed hexanes | 113 | .098 | 36.7 |
| 23. 1" iron oxide coated plate cut at 40° bevel | (a) propane | 60 | .23 | — |
| | (b) same as (a) with 4:4:1 mixture of pentane, iso-pentane and mixed hexanes | 90 | .15 | 34.7 |
| 24. 1" carbon steel plate straight cut | (a) propane | 125 | .1032 | — |
| | (b) same as (a) with 4:4:1 mixture of pentane, iso-pentane and mixed hexanes | 140 | .090 | 12.8 |

A cost per foot was determined for each of the additive and non-additive tests. In calculating the cost per foot, the cost of fuel and labor were calculated. Since the additive composition resulted in faster cutting speeds, the labor cost per unit of length cut was substantially less using the additive compositions. The cost savings were then determined based on a comparison of the cost per foot results with and without additive.

What is claimed is:

1. In a method of cutting or brazing workpieces consisting of solid state ceramic materials, including metals, by heat energy transfer, including radiant energy absorption, the steps of
    compounding a fuel gas mixture by mixing a gaseous base fuel selected from the group consisting of methane, propane, acetylene, and mixtures thereof, with a supplemental organic heat additive, and oxygen,
    said supplemental organic heat additive consisting of a series of combustible hydrocarbons which, when combusted, emit radiation energy waves within the range of greatest absorbability of the materials to be cut or brazed, and which are non-corrosive with respect to the material being cut or brazed,
    said supplemental organic heat additive being added to the gaseous base fuel in an amount of from ½% to 20% by weight of the gaseous base fuel,
    preparing the workpiece material for cutting or brazing by increasing the temperature of a localized area of the workpiece material to be cut or brazed to a temperature suitable for cutting or brazing, and combusting said fuel gas mixture containing said supplemental organic heat additive in such juxtaposition to said workpiece material whose temperature has been increased as aforesaid as to transfer radiant heat energy within the range of wave lengths of greatest absorbability of the workpiece material, and convective heat energy, to said workpiece material in an amount sufficient to cause a change of state of said work piece material.

2. The method of claim 1 further characterized in that said supplemental organic heat additive is added to the gaseous base fuel in an amount of from 2% to 10% by weight of the gaseous base fuel.

3. The method of claim 2 further characterized in that the supplemental organic heat additive is added to the gaseous base fuel in an amount from 1½% to 7½% by weight of the gaseous base fuel.

* * * * *